United States Patent

[11] 3,598,035

| [72] | Inventors | Jacob S. Haller;<br>Hans Kist; Andor Fleischman, all of<br>Northbrook, Ill. |
|---|---|---|
| [21] | Appl. No. | 719,586 |
| [22] | Filed | Apr. 8, 1968 |
| [45] | Patented | Aug. 10, 1971 |
| [73] | Assignee | Indentification Development Corporation |

[54] LENS ASSEMBLY
9 Claims, 7 Drawing Figs.

[52] U.S. Cl.................................................. 95/38,
355/53
[51] Int. Cl................................................ G03b 19/02
[50] Field of Search....................................... 95/38;
355/53

[56] References Cited
UNITED STATES PATENTS
475,919  5/1892  DeBarril...................... 95/38

FOREIGN PATENTS
190,447  7/1937  Switzerland.................. 95/38

*Primary Examiner*—John M. Horan
*Attorney*—Dressler, Goldsmith, Clement & Gordon ABSTRACT: A lens assembly for exposing a plurality of different regions within a fixed area through a single lens mounted on a rotatable lens turret. Upon initiation of a cycle of operation, a region corresponding to the position of the lens is exposed and the turret is automatically rotated to index the lens into position for exposure of another region. In a configuration where the area is rectangular in shape and four rectangular regions are disposed two by two within the area, the disk is rotated through different angles after alternate exposures to properly align the lens with the next region to be exposed.

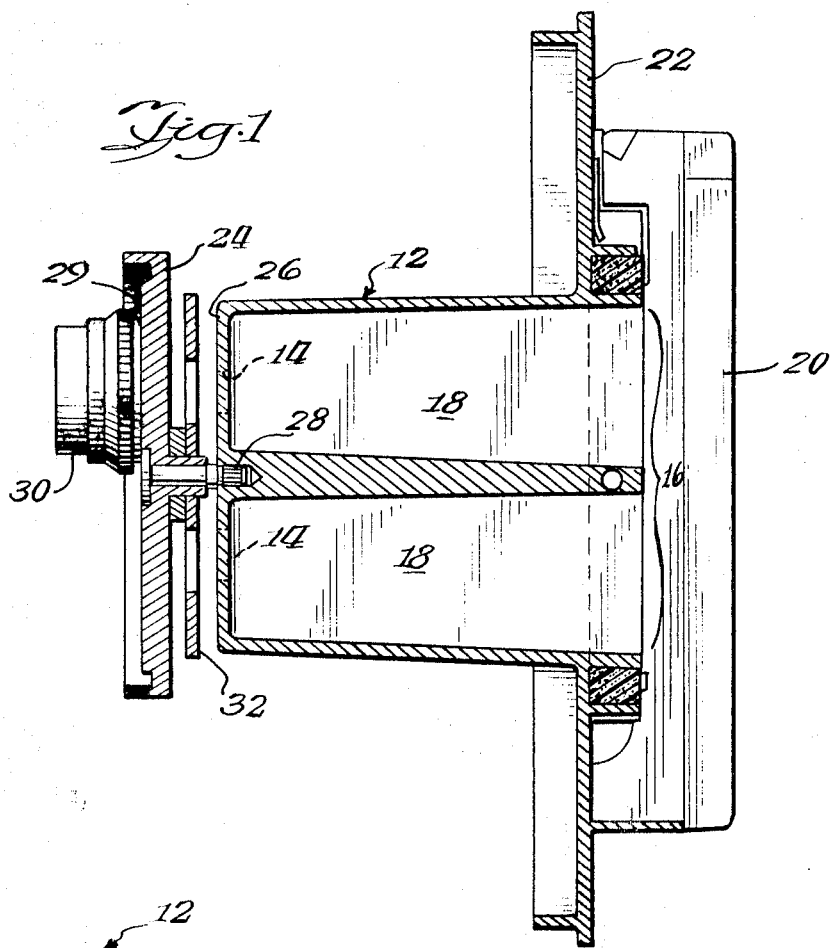
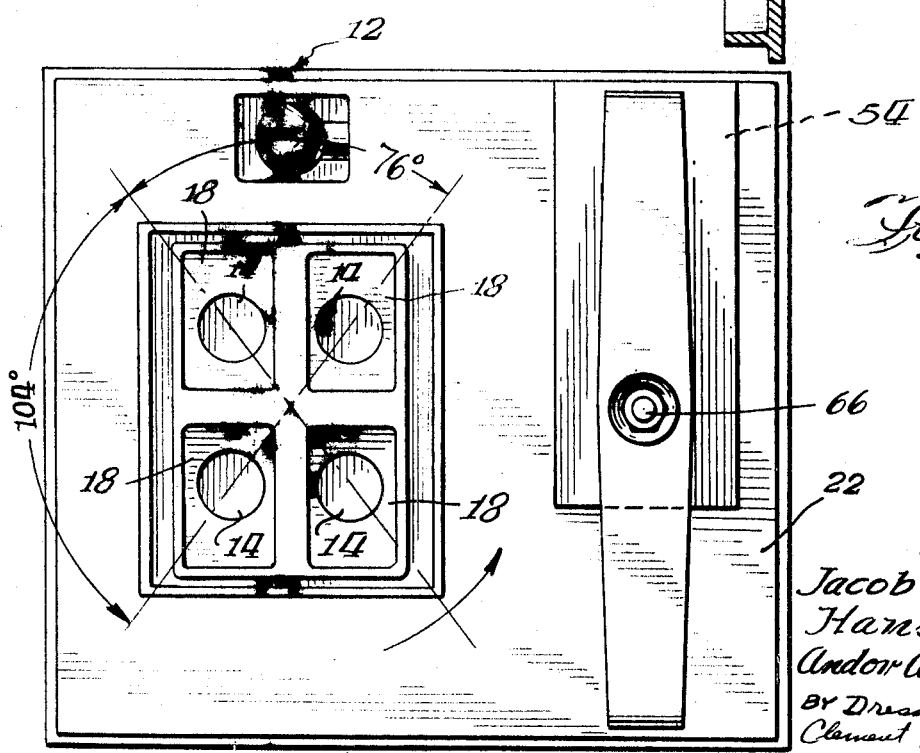

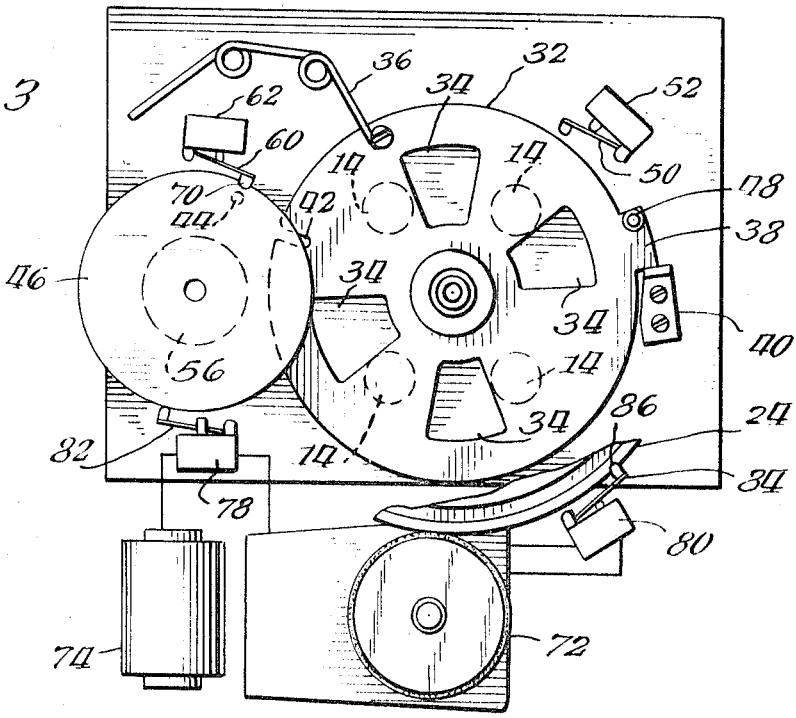
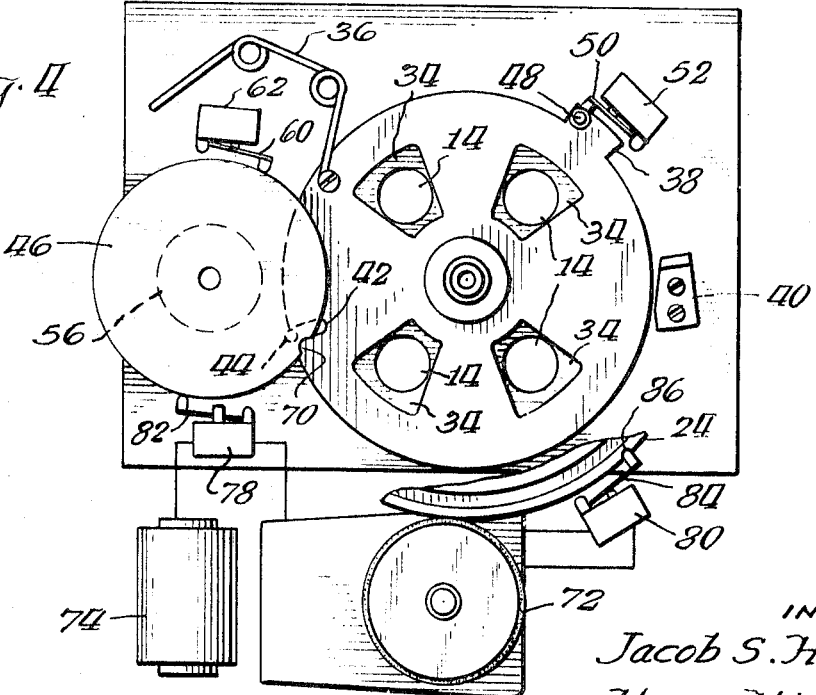

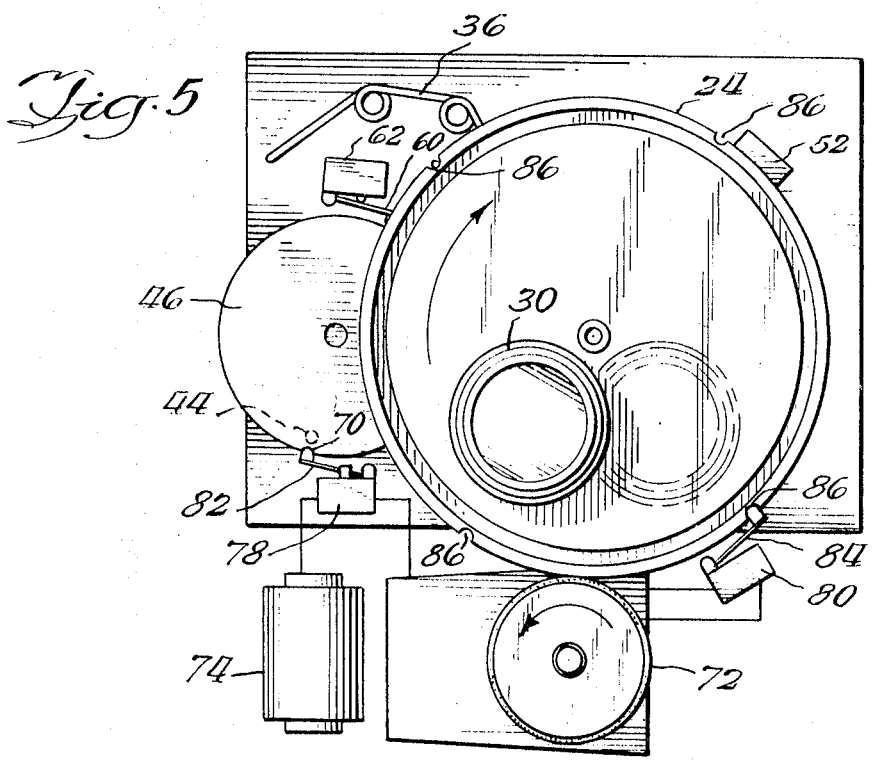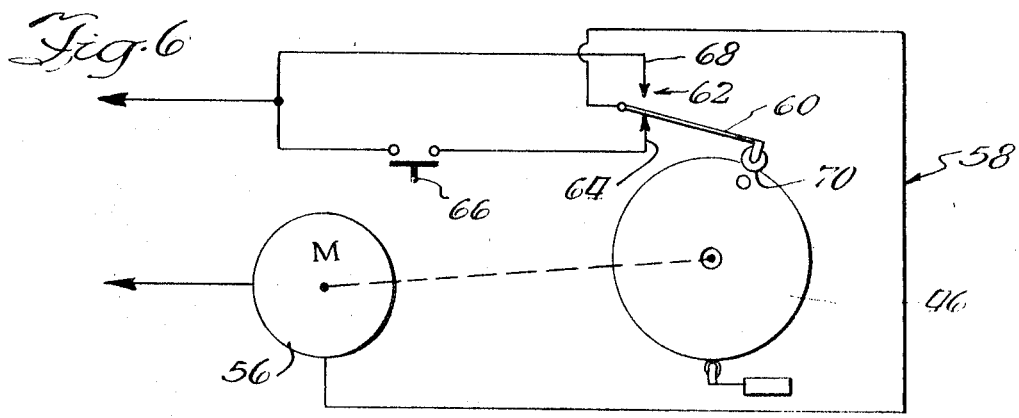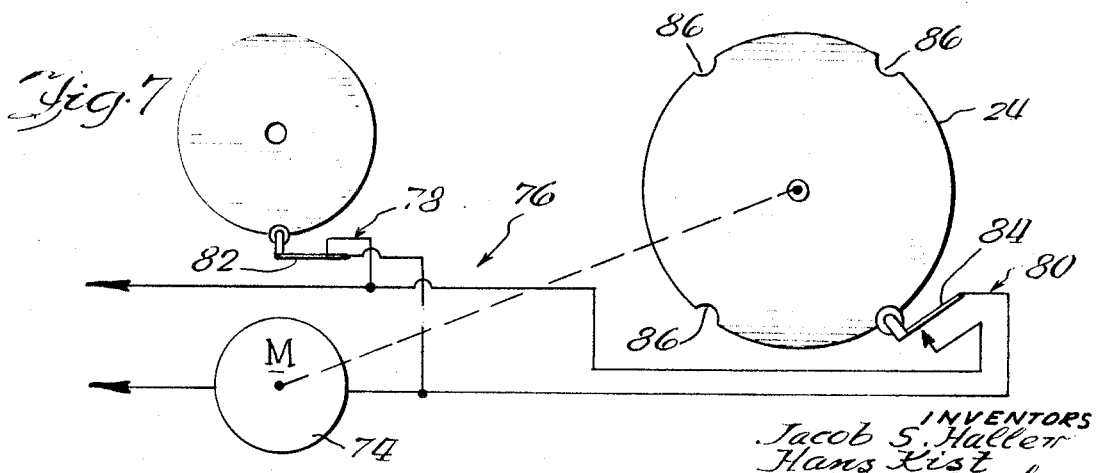

LENS ASSEMBLY

BACKGROUND

There are many potential applications for cameras which have the capability of exposing a plurality of regions within a given area, e.g., taking more than one photograph on a single sheet of film or positive photographic paper. One of the most common applications is in taking photographs for identification cards, drivers' licenses and the like.

In producing such identification card pictures, it is often desirable to have the picture available immediately after or at least shortly after it is taken. For this reason, many identification cameras utilize products, such as Polaroid film, so that pictures can be made available almost immediately after being taken. Such products are not, however, inexpensive, and any savings on material costs become important.

Since the dimensions of most identification photos are about one to two inches by two to three inches, clearly it is quite uneconomical to take only one picture on each piece of Polaroid film which is about 3×¼4× inches. However, if each piece of Polaroid film could be used for four pictures, then each of these photographs would have dimensions of about 1⅝×2⅛ inches, ideal for utilization with identification cards.

Some cameras that take such multiple photographs use a single lens which, after each picture is taken, is manually repositioned for the next picture. In such manual operations, the photographer sooner or later either forgets to rotate the lens after a picture is taken, resulting in duplication of work due to the resulting double exposure, or rotates the lens when a picture has not been taken. In either case, film is wasted and the already high material costs creep higher.

Since identification pictures are often taken under pressure and in large numbers, for example, on school registration days, such mistakes are quite likely to occur at a rate above that which is economically feasible. Not only does this adversely affect the economics of such an operation, but the resulting bottleneck in the registration process could become intolerable.

SUMMARY OF INVENTION

In accordance with the present invention, there is provided a lens assembly in which a plurality of regions within a fixed area are exposed through a single lens that is automatically indexed into successive positions after each exposure to each region may be sequentially exposed.

For convenience and clarity, the present invention is described below with respect to its use in cameras. However, it should be understood that the present invention is applicable to other devices in which a plurality of exposures are to be made.

A camera suitable for use with the present invention includes a plurality of optically separate channels, typically four in number, extending from the lens assembly which is mounted in the front of the camera to the film to be exposed attached to the back of the camera. The channels are disposed two by two to define a rectangular area, and each channel defines a region within the area that may be separately exposed. Each region is exposed through the lens when aligned therewith. Immediately after the exposure, the lens is indexed into alignment with another channel in position for exposure of the next region.

In the typical two-by-two four-channel arrangement, the fixed area on which the four exposures are made is rectangular in shape. Indexing of the lens in such an arrangement can be effected by mounting the lens in a rotatable lens turret, the rotation of which will align the lens with each of the optically separate channels. In this configuration, the turret alternately rotates through two different angles to index the lens into proper alignment with the optical channels and the regions to be exposed.

More specifically, before a cycle of operation is initiated, the lens is aligned with one of the optically separate channels. A shutter plate provided with a plurality of exposure apertures, one for each region to be exposed, is disposed between the lens and the optical channels. In its closed position, the shutter plate covers all of the channels, and in its open position, it uncovers all of the channels. During the initial portion of the operating cycle, the shutter plate is rotated to align each of the exposure apertures with one of the optical channels. Since the lens is aligned with only one channel, only the region aligned with this channel is exposed, the remaining three channels being covered by the lens turret.

As the exposure apertures become aligned with the optical channels, a lighting circuit is closed to activate a flash or other suitable light source used to effect exposure. Immediately after exposure, the shutter plate is released and returns to its closed position under action of suitable biasing means, such as a spring.

After exposure, the lens turret is rotated through an appropriate angle to index the lens into alignment with the optical channel through which the next exposure is to be made. Rotation of the lens turret is effected by a simple pin and slot arrangement. The pin is mounted adjacent the perimeter of a main timing disk driven by a timing motor. As the timing disk rotates, the pin enters an axial slot in the shutter plate causing the shutter plate to rotate about 45° into its open position. Continued rotating of the timing disk causes the pin to exit from the slot after exposure, thereby allowing the shutter plate to return to its closed position under action of the biasing spring.

As the timing disk continues to rotate, it engages a switch to close a turret motor circuit, thereby initiating rotation of the lens turret. Another switch, closed by rotation of the turret plate, keeps the turret motor circuit closed until the lens is properly indexed. At this point all switches are opened and the operating cycle terminates with the lens properly positioned in alignment with the next region to be exposed.

Numerous other advantages and features of the present invention will become readily apparent from the following detailed description of the invention and of one embodiment thereof, from the claims, and from the accompanying drawings in which each and every detail shown is fully and completely disclosed as part of this specification, in which like reference numerals refer to like parts, and in which:

FIG. 1 is a diagrammatic side view, partially in section, of the overall arrangement of a camera to which the lens assembly is attached;

FIG. 2 is a back view of the camera of FIG. 1 showing four separate optical channels;

FIG. 3 is a front view of the lens assembly showing the shutter plate in closed position;

FIG. 4 is a front view showing the shutter plate in open position;

FIG. 5 is a front view showing the lens turret in place;

FIG. 6 is a timing motor circuit diagram; and

FIG. 7 is a turret motor circuit diagram.

Referring now to the drawings, there is shown one embodiment of the lens assembly of the present invention mounted on a camera suitable for use with the lens assembly. The camera consists of a casing (not shown) which encloses a main casting 12. The casting 12 is divided into four separate optical channels 14 disposed two by two to define a fixed rectangular area 16. Each optical channel 14 delineates a region 18 of about one-quarter of the rectangular area 16. A film pack 20, such as Polaroid film pack, is attached to the back 22 of the casting 12 and covers the entire area 16.

A lens turret 24 is mounted on the front 26 of the main casting 12 to rotate about its axis on a shaft 28. The lens turret 24 is provided with an opening 29 in which is disposed a suitable lens 30 through which exposures are made. Rotation of the lens turret 24 indexes the lens 30 into successive positions wherein the lens is aligned with each of the optical channels 14 so the regions 18 disposed behind each channel may be sequentially exposed.

A shutter plate 32 is located between the lens 30 and the optical channels 14 and is rotatably mounted on the turret shaft 28. The shutter plate 32 includes a plurality of exposure apertures 34, one for each region 18 to be exposed. The shutter plate 32 is biased in a clockwise direction, as seen in FIGS. 3 and 4, into closed position by a spring 36 until a stop segment 38, which extends out from the periphery of the shutter plate 32, abuts against a fixed stop 40. In the closed position, the shutter plate 32 completely covers all of the optical channels 14 to prevent exposure of any region 18.

A radial slot 42 in the shutter plate 32 is adapted to be engaged by a shutter pin 44 attached to a timing disk 46 adjacent its periphery. As the timing disk 46 rotates (clockwise as shown in FIGS. 3 and 4), the shutter pin 44 enters the radial slot 42 causing the shutter plate 32 to rotate (counterclockwise, as shown in FIGS. 3 and 4) until the exposure apertures 34 completely uncover the optical channels 14. With the optical channels uncovered, a pin 48 affixed to the stop segment 38 engages the contact arm 50 of a switch 52 to close an electrical circuit triggering a flash unit 54, thereby effecting the desired exposure.

When the shutter pin 44 exits from the radial slot 42 in the shutter plate 32, the shutter plate returns to its closed position under action of the bias spring 36. This occurs as the timing disk 46 continues to rotate. The timing disk 46 is driven by a timing motor 50 connected in a timing circuit shown schematically in FIG. 6.

The timing circuit 48 includes a source of power connected in series with the timing motor 56 and the contact arm 60 of a S.P.D.T. timing switch 62 and alternatively either through the normally closed contact 64 of the timing switch and a normally open pushbutton 66, or through normally open contact 68 of timing switch 62 to bypass the pushbutton 66. The contact arm 60 is operated by a detent 70 formed in the periphery of the timing disk 46. When the detent 70 is in engagement with the contact arm 60 of the timing switch 62, the timing switch is considered to be in its normal position.

When the pushbutton 66 is depressed, the timing circuit 58 to the motor 46 is initially closed through the normally closed contact 64 of timing switch 62. As the timing motor 56 starts, it rotates the timing disk 46 causing the detent to disengage the contact arm 60. The contact arm 60 is thereby shifted to close normally open contact 68 and open normally closed contact 64, bypassing pushbutton 66. The timing circuit 58, therefore, remains closed until the timing disk 46 completes on revolution, and the detent 70 again engages the contact arm 60 of timing switch 62 returning it to its normal position.

The timing disk 46 also initiates rotation of the lens turret 24. The lens turret 24 is rotated through a frictional drive wheel 72 by a turret motor 74. The turret circuit 76 is shown schematically in FIG. 7. The turret motor 74 is connected to a source of power, either through turret start switch 78 or turret stop switch 80 connected in parallel with each other.

The timing start switch is momentarily closed as its contact arm 82 is engaged by the detent 70. Immediately the turret motor 74 starts, rotating the lens turret 24. Before the turret motor 74 starts, the contact arm 84 of normally open turret stop switch 80 is engaged by one of four detents 86 in the lens turret 24. The turret stop switch 80 is closed as the lens turret begins to rotate to keep the turret circuit 76 closed until the lens turret 24 is rotated through the proper angle, i.e., the lens 30 is properly aligned with the next region 18 to be exposed. When the lens turret 24 reaches this position, the next detent 86 engages the contact arm 84 of the turret stop switch 80, opening the switch and the timing circuit 76 to stop the turret motor 74 and rotation of the lens turret 24.

It should be noted that the detents 86 in the periphery of the lens turret 24 are alternately spaced apart 104° and 76° so that the lens turret 24 is alternately rotated through these angles. As can be seen in FIG. 2, since the four regions 18 within the fixed area 16 form a rectangle, the lens turret 24 is rotated alternately through these two angles in order to properly align the lens 30 with the region to be exposed.

In operation, the pushbutton 66 is depressed, closing timing circuit 58 and starting timing motor 56 to rotate the timing disk 46. Rotation of the timing disk 46 first operates the timing switch 62, bypassing the pushbutton 66 to keep the timing motor 56 running even though the pushbutton 66 is released. As the timing disk 46 rotates, the shutter pin 48 enters the radial slot 42 in the shutter plate 32 to initiate rotation thereof. The shutter plate 32 is rotated until the optical channels 14 are completely uncovered, at which time the flash switch 52 is closed to trigger the flash unit 34 and effect exposure. Continued rotation of the timing disk 46 causes the shutter pin 48 to exit from the radial slot 42, allowing the shutter plate 32 to return to its closed position under action of the bias spring 36.

Further rotation of the timing disk 46 momentarily closes the turret start switch 78, closing turret circuit 76 and starting turret motor 74. The turret motor 74 rotates the lens turret 24 through the drive wheel 72, thereby closing the turret stop switch 80 to keep the turret motor 74 running. The turret motor continues to operate until the contact arm 84 of the turret stop switch 80 enters the next detent 86 in the periphery of the lens turret 24, thereby opening the switch 80 and stopping the motor 74 with the lens 30 in its proper position to expose the next region 18 when the pushbutton 66 is again depressed.

Thus, there has been disclosed a lens assembly which allows for exposure of a plurality of regions within a fixed area through a single lens and which automatically operates to effect an exposure of one such region and index the lens into position for exposure of the next region to be exposed.

It will be readily observed from the foregoing detailed description of the invention and in the illustrated embodiments thereof that numerous variations and modifications may be effected without departing from the true spirit and scope of the novel concepts and principles of this invention.

What we claim is:

1. A lens assembly for exposing through a single lens a plurality of different light responsive regions within a fixed area comprising in combination lens support means defining a lens aperture, means for indexing said lens aperture into successive positions whereby each of a plurality of regions within the fixed area may be sequentially exposed through said lens opening, shutter means disposed between said lens support means and the fixed area to be exposed for exposing all of said regions to said lens support means, said shutter means having an opening for each of said regions, and timing means for selectively moving said shutter means from a first position to a second position to effect exposure of one region corresponding to the position of said lens aperture and for automatically activating said lens aperture indexing means to position said lens aperture for exposure of the next succeeding region.

2. The lens assembly of claim 1 in which said lens support means is a rotatable lens turret, and in which said indexing means automatically initiates rotation of said lens turret after said timing means operates said shutter means.

3. The lens assembly of claim 2 in which the fixed area is rectangular in shape and in which said indexing means alternately rotates said lens turret through two different angles to compensate for different angular positions of the regions to be exposed with respect to the center of the rectangular area within which the regions lie.

4. A lens assembly comprising a rotatable lens turret having a lens opening in which a lens may be mounted, said lens turret being rotatable to position said lens opening in a plurality of successive exposure positions, a shutter plate axially aligned with said lens turret and defining an exposure aperture for each exposure position, said shutter plate being reciprocably rotatable between an open position wherein said exposure apertures are aligned with said exposure positions and a closed position where said exposure apertures are offset from said exposure positions, timing means for rotating said shutter plate from said open position to said closed position after movement of said shutter plate to said open position, and index means responsive to said timing means for automatically rotating said lens turret to position said lens opening into successive exposure positions after each exposure.

5. A lens assembly as claimed in claim 4 in which said timing means includes a rotatable timing disk having shutter plate rotating means, timing motor means for driving said timing disk, timing switch means adapted, when closed, to start said motor, and means on said timing disk for opening said switch means after the lens turret is rotated.

6. A lens assembly as claimed in claim 5 in which said shutter plate rotating means includes a pin attached adjacent the periphery of said timing disk, a radial slot formed in said shutter plate, said pin, during rotation of said timing disk, cooperating with said slot for rotating said shutter plate to said open position, and said means for rotating said shutter plate into closed position including a bias spring operable when said pin exits from said radial slot.

7. A lens assembly as claimed in claim 4 in which said index means includes a drive wheel coupled to said lens turret, turret motor means for driving said drive wheel to rotate said lens turret, turret start switch means responsive to said timing means for starting said turret motor means, and turret stop switch means responsive to the position of said lens turret for stopping said turret motor means when said lens opening is in the next exposure position.

8. In a camera for successively exposing through a single lens a plurality of regions within a fixed area on a piece of film the improvement comprising a lens turret rotatably mounted on the camera in front of said film, said lens turret supporting a lens for positioning the lens into successive alignment with each of said regions, a shutter plate provided with an axial slot and with an exposure aperture for each region to be exposed, said shutter plate being disposed in axial alignment with said lens turret and between said turret and the film and being reciprocably rotatable between an open position wherein said exposure apertures uncover all of said regions and a closed position wherein said regions are covered, a rotatable timing disk having a peripheral detent and a pin, a timing motor for rotating said timing disk whereby said pin first engages said axial slot to rotate said shutter plate from said closed position to said open position to effect exposure of the one region aligned with the lens and whereby said pin next exits from said slot, a bias spring connected to said shutter plate for rotating said shutter plate to said closed position when said pin exits from said slot, a turret motor for rotating said lens turret, a turret start switch closed by said timing disk detent after said pin exits from said axial slot for starting said turret motor, and a turret stop switch responsive to the position of said lens turret for stopping said turret motor when said lens is in alignment with the next region to be exposed.

9. The improvement of claim 8 further including lighting switch means, and means on said shutter plate for closing said lighting switch means when said shutter plate is in the open position, whereby a light source is triggered for exposure of the film.